United States Patent

Kobayashi et al.

(10) Patent No.: US 8,051,566 B2
(45) Date of Patent: Nov. 8, 2011

(54) METHOD FOR MANUFACTURING RIGID INTERNAL GEAR OF WAVE GEAR DEVICE

(75) Inventors: Masaru Kobayashi, Minamiazumi-gun (JP); Toshihiko Kaji, Itami (JP)

(73) Assignees: Harmonic Drive Systems, Inc., Tokyo (JP); Sumitomo Electric Sintered Alloy, Ltd., Okayama-Ken (JP)

( * ) Notice: Subject to any disclaimer, the term of this patent is extended or adjusted under 35 U.S.C. 154(b) by 0 days.

(21) Appl. No.: 12/788,768

(22) Filed: May 27, 2010

(65) Prior Publication Data

US 2010/0229395 A1      Sep. 16, 2010

Related U.S. Application Data

(62) Division of application No. 11/160,585, filed on Jun. 29, 2005, now Pat. No. 7,748,118.

(30) Foreign Application Priority Data

Jul. 1, 2004 (JP) ................................ 2004-195635

(51) Int. Cl.
*B21K 1/30* (2006.01)
(52) U.S. Cl. ... 29/893.34; 29/893; 29/893.3; 29/893.35; 74/640; 419/27
(58) Field of Classification Search ............... 29/893.34, 29/893, 893.3, 893.35; 74/640; 419/27
See application file for complete search history.

(56) References Cited

U.S. PATENT DOCUMENTS

| 4,145,798 | A | 3/1979 | Sarnes |
| 4,347,076 | A | 8/1982 | Ray et al. |
| 5,659,955 | A | 8/1997 | Plamper |
| 6,682,220 | B2 | 1/2004 | Kobayashi |
| 6,874,231 | B2 | 4/2005 | Kobayashi et al. |
| 2002/0174742 | A1 | 11/2002 | Kobayashi |
| 2002/0184968 | A1 | 12/2002 | Kobayashi et al. |
| 2006/0000093 | A1* | 1/2006 | Kobayashi et al. ........ 29/893.34 |

FOREIGN PATENT DOCUMENTS

| EP | 0 375 337 | 6/1990 |
| JP | 56-084121 | 7/1981 |
| JP | 10-318338 | 12/1998 |
| JP | 2002-307237 | 10/2002 |
| JP | 2002-339990 | 11/2002 |

\* cited by examiner

*Primary Examiner* — Richard Chang
(74) *Attorney, Agent, or Firm* — Buchanan Ingersoll & Rooney, P.C.

(57) ABSTRACT

A method for manufacturing a rigid internal gear of a wave gear device in which an internally toothed portion formed with internal teeth and a gear main body portion are joined integrally, the method including preforming an internal teeth-forming ring or disc for forming the internally toothed portion by using a first aluminum alloy powder; manufacturing a forging in which the internal teeth-forming ring or disc is placed in a forging die and is integrally formed on its outer side with the gear main body portion using a second aluminum alloy powder, the first aluminum alloy powder being harder and having higher abrasion resistance than the second aluminum alloy powder; and applying post-processing including cutting teeth to the forging.

1 Claim, 3 Drawing Sheets

METHOD FOR MANUFACTURING RIGID INTERNAL GEAR OF WAVE GEAR DEVICE

CROSS-REFERENCE TO RELATED APPLICATIONS

This application is a divisional of U.S. application Ser. No. 11/160,585 filed on Jun. 29, 2005, which claims priority to Japanese Application No. 2004-195635 filed on Jul. 1, 2004. The entire contents of U.S. application Ser. No. 11/160,585 and Japanese Application No. 2004-195635 are incorporated herein by reference.

BACKGROUND OF THE INVENTION

1. Field of the Invention

The present invention relates to a method for manufacturing a rigid internal gear of a wave gear device in which an internally toothed portion formed with internal teeth and a gear main body are securely joined and integrated.

2. Description of the Related Art

A wave gear device commonly has an annular rigid internal gear, a flexible external gear disposed on an inner side thereof, and a wave generator fitted inside the flexible external gear. The wave generator is commonly elliptically contoured, the flexible external gear is elliptically flexed by the wave generator, and external teeth formed on an external peripheral surface thereof partially mesh with internal teeth of the rigid internal gear. When the wave generator is rotated by a motor or the like, the meshing locations of the two gears move circumferentially. Since there is a difference in the number of external and internal teeth, relative rotational movement is produced between the two gears in accordance with the difference in the number of teeth. Therefore, when one of the gears is fixed in place, a reduced rotational output can be obtained from the other gear.

The wave gear device has few components and is lightweight in comparison with other forms of reduction gears. The rigid internal gear, which is a constituent component thereof, must be made more lightweight in order to reduce the device weight. More specifically, since the rigid internal gear is required to be strong and abrasion resistant, heavy iron or copper materials are used in its manufacture. For this reason, a weight ratio of the rigid internal gear is considerable in comparison with other constituent components. In particular, when the rigid internal gear is integrally formed with a mounting flange for mounting on the motor or an output-side member, or when a housing is integrally formed, the weight is considerable, and the advantage of a lightweight flexible meshing type gear device is compromised.

It has been proposed that a portion of the rigid internal gear in which internal teeth are formed, which require strength and abrasion resistance, be manufactured from a ring comprised of an iron or copper material that has strength and high abrasion resistance, a gear main body portion be manufactured from a ring composed of an aluminum alloy or other lightweight material, and the rings be integrally joined together. Rigid internal gears with such a configuration are disclosed in JP-A 2002-339990 and JP-A 2002-307237.

In a rigid internal gear with such a configuration, considerable torque must be transmitted between the ring for forming the gear main body portion and the ring for forming the internally toothed potion, and the rings must therefore be securely joined.

SUMMARY OF THE INVENTION

A main object of the present invention is to provide a method for manufacturing a rigid internal gear in which an internally toothed portion formed with internal teeth is formed from a strong material with high abrasion resistance, in which a gear main body portion is formed with lightweight materials, and in which these portions can be securely integrated, and to provide a rigid internal gear manufactured with this method.

To achieve the above and other objects, the present invention provides A method for manufacturing a rigid internal gear of a wave gear device in which an internally toothed portion formed with internal teeth and a gear main body portion are joined integrally, the method including preforming an internal teeth-forming ring or disc for forming the internally toothed portion by using a first aluminum alloy powder; manufacturing a forging in which the internal teeth-forming ring or disc is placed in a forging die and is integrally formed on its outer side with the gear main body portion using a second aluminum alloy powder, the first aluminum alloy powder being harder and having higher abrasion resistance than the second aluminum alloy powder; and applying post-processing including cutting teeth to the forging.

In the rigid internal gear produced by the method of the present invention, the gear main body portion and the internally toothed portion are securely integrated by powder forging. Therefore, both portions are not required to be integrated using bolts or the like, and a lightweight rigid internal gear with high durability can therefore be obtained.

It is also possible to adopt hot extrusion in place of powder forging to manufacture a rigid internal gear.

More specifically, the present invention provides a method for manufacturing a rigid internal gear of a wave gear device in which an internally toothed portion formed with internal teeth and a gear main body portion are integrally formed, wherein a gear main body ring for forming the gear main body portion is preformed using a first aluminum alloy powder;

an internal teeth-forming ring or disc for forming the internally toothed portion is preformed using a second aluminum alloy powder;

the internal teeth-forming ring or disc is fitted inside the gear main body ring and these are hot extruded to produce an integrated composite ring or composite disc; and post-processing is performed, including cutting teeth in the resulting composite ring or composite disc; and wherein the second aluminum alloy powder is harder and has higher abrasion resistance than the first aluminum alloy powder.

Instead of preforming both the gear main body ring and the internal teeth-forming ring, it is possible to preform solely the gear main body ring, to manufacture a composite ring or composite disc in which the internally toothed portion is integrated inside the gear main body ring by hot extrusion using the second aluminum alloy powder, and to post-process the ring or disk.

More specifically, the present invention provides a method for manufacturing a rigid internal gear of a wave gear device in which an internally toothed portion formed with internal teeth and a gear main body portion are integrally formed, wherein a gear main body ring for forming the gear main body portion is preformed using a first aluminum alloy powder;

a composite ring or composite disc is manufactured in which the internally toothed portion is integrated inside the gear main body ring by hot extrusion using a second aluminum alloy powder; and post-processing is performed, including cutting teeth in the composite ring or composite disc; and wherein the second aluminum alloy powder is harder and has higher abrasion resistance than the first aluminum alloy powder.

Conversely, it is also possible to preform solely the internal teeth-forming ring or disc, to manufacture a composite ring or composite disc in which the gear main body portion is integrated outside the internal teeth-forming ring or disc by hot extrusion using the first aluminum alloy powder, and to post-process the ring or disk.

More specifically, the present invention provides a method for manufacturing a rigid internal gear of a wave gear device in which an internally toothed portion formed with internal teeth and a gear main body portion are integrally formed, wherein an internal teeth-forming ring or disc for forming the internally toothed portion is preformed using a second aluminum alloy powder;

a composite ring or composite disc is manufactured in which the gear main body portion is integrated outside the internal teeth-forming ring or disc by hot extrusion using a first aluminum alloy powder; and post-processing is performed, including cutting teeth in the composite ring or composite disc; and wherein the second aluminum alloy powder is harder and has higher abrasion resistance than the first aluminum alloy powder.

In the rigid internal gear produced by the method of the present invention, the gear main body portion and the internally toothed portion are securely integrated by hot extrusion. Both portions are not therefore required to be integrated using bolts or the like, and a lightweight rigid internal gear with high durability can be obtained.

DESCRIPTION OF THE PREFERRED EMBODIMENTS

The present invention will be described in detail below with reference to the drawings.

Figure 1:
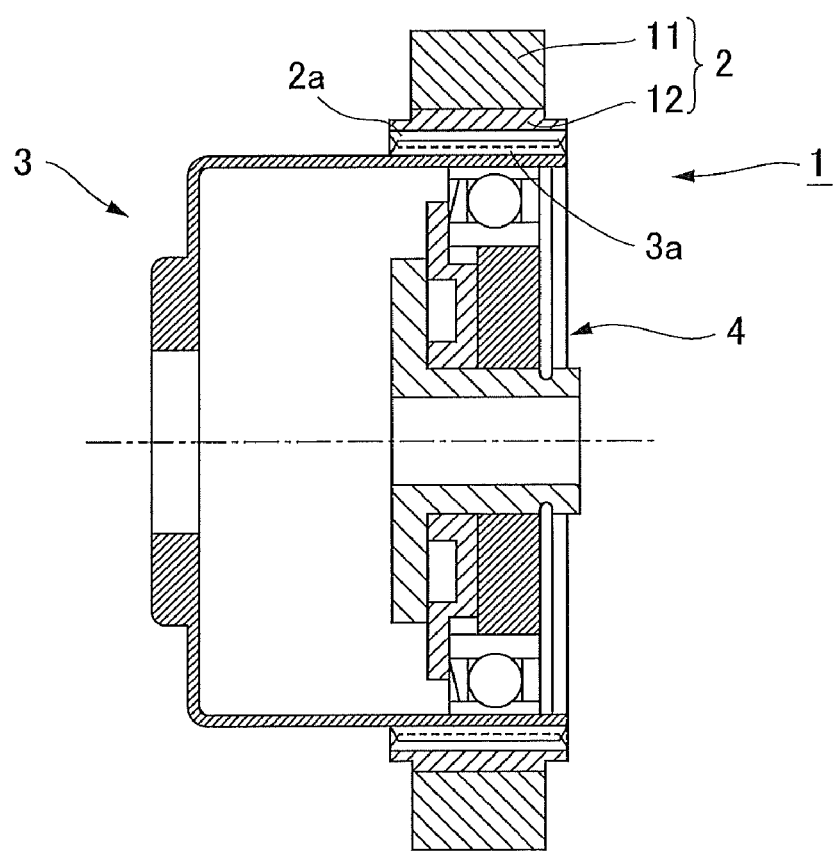
FIG. 1 is a schematic cross-sectional view showing an example of a wave gear device according to the present invention.
Figure 2:
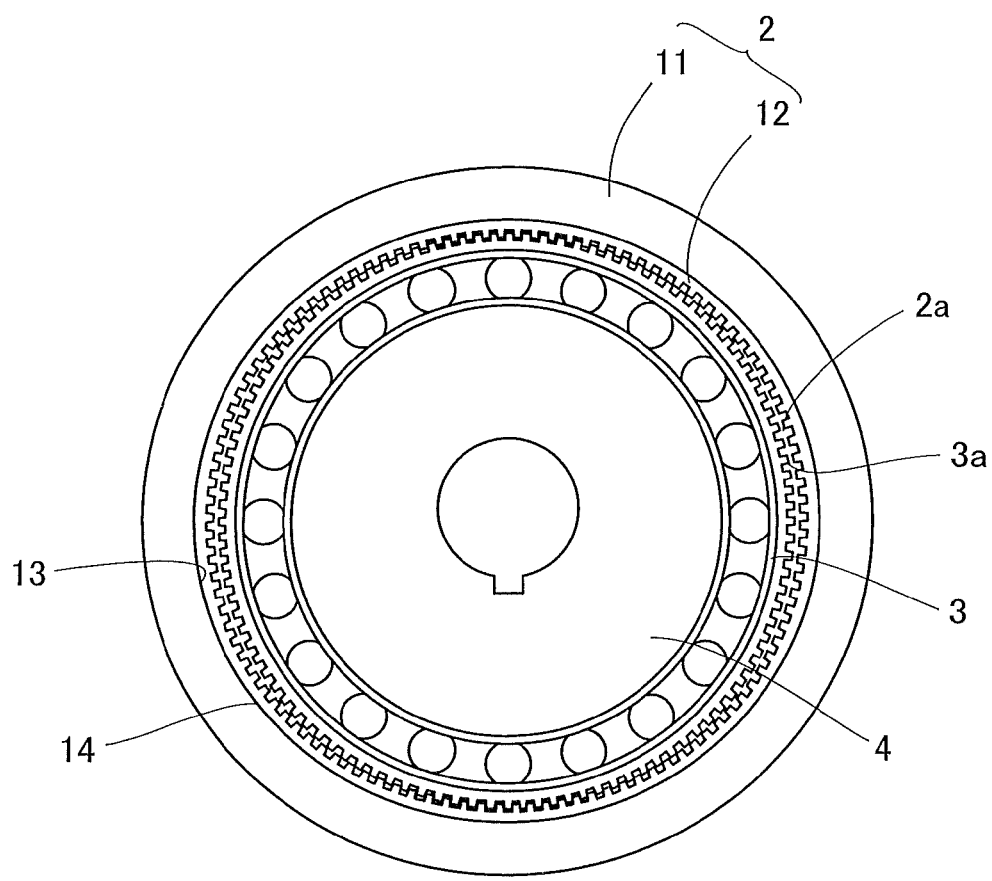
FIG. 2 is a schematic front view of the wave gear device of FIG. 1.

FIG. 1 is a schematic cross-sectional view showing a wave gear device, and FIG. 2 is a schematic front view thereof. As shown in the drawings, a wave gear device 1 is comprised of an annular rigid internal gear 2, a cup-shaped flexible external gear 3 disposed inside thereof, and a wave generator 4 fitted therein. The wave generator 4 is elliptically contoured and the flexible external gear 3 is elliptically flexed, causing external teeth 3a to partially mesh with internal teeth 4a at both ends of a major axis of the ellipsis. When the wave generator 4 is rotatably driven by a motor or another high speed rotating drive source, the meshing locations of the gears 2 and 3 move circumferentially. The difference in the number of teeth of the gears 2 and 3 is usually two, and relative rotational movement is produced between the gears 2 and 3 due to the difference in the number of teeth. Usually, the rigid internal gear 2 is fixed in place and a considerably reduced rotational output can be obtained from the flexible external gear 3.

The rigid internal gear 2 is comprised of an annular gear main body 11 and an internally toothed portion 12 in which internal teeth 3a are formed on its internal peripheral surface. The gear main body portion 11 is formed from a first aluminum alloy, and the internally toothed portion 12 is formed from a second aluminum alloy. The second aluminum alloy has lower processability and is less durable, but has higher abrasion resistance and is harder than the first aluminum alloy. The two portions 11 and 12 are integrated by powder forging or hot extrusion, as described below.

Figure 3:
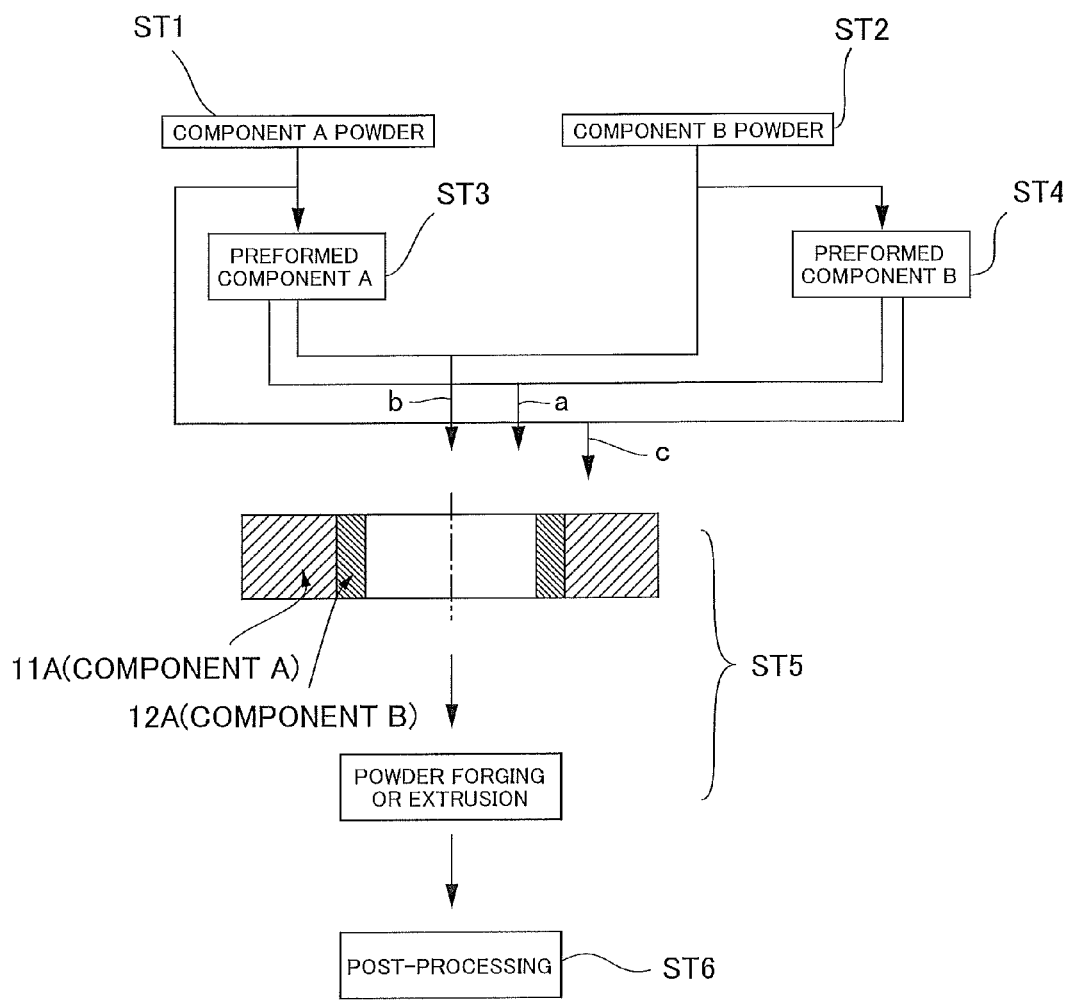
FIG. 3 is a schematic flowchart showing the manufacturing method of a rigid internal gear of the wave gear device of FIG. 1.

FIG. 3 is a schematic flowchart showing manufacturing steps of the rigid internal gear 2 of the present example. Describing the steps with reference to the diagram, the first aluminum alloy powder comprised of component A and the second aluminum alloy powder comprised of component B are initially manufactured (steps ST1 and ST2).

Next, a gear main body ring 11A for forming the gear main body portion 11 is preformed using the first aluminum alloy powder (step ST3). The component is formed by compacting, or compacting and sintering.

Similarly, an internal teeth-forming ring 12A for forming the internally toothed portion 12 is preformed using the second aluminum alloy powder (step ST4). An internal teeth-forming disc may be preformed in lieu of the internal teeth-forming ring 12A.

Next, the internal teeth-forming ring 12A is fitted inside the gear main body ring 11A and these components are integrated by powder forging to manufacture a ring-shaped forging (arrow a, step ST5).

The resulting forging is subjected to post-processing, which includes cutting teeth in its internal peripheral surface, to yield the rigid internal gear 2 (step ST6).

In this configuration, instead of preforming both the gear main body ring 11A and internal teeth-forming ring 12A, a forging in which the internally toothed portion 12 is integrated inside the gear main body ring can be manufactured by preforming solely the gear main body ring 11A, placing the gear main body ring 11A in the forging die, and using the second aluminum alloy powder to powder-forge the components (arrow b, step ST5).

Conversely, a forging in which the gear main body 11 is integrated outside of internal teeth-forming ring 12A can be manufactured by preforming solely the internal teeth-forming ring 12A, placing the internal teeth-forming ring 12A in the forging die, and using the first aluminum alloy powder to powder-forge the components (arrow c, step ST5).

Also, instead of powder forging (step ST5), a composite ring can be manufactured in which the gear main body ring 11A and the internal teeth-forming ring 12A are integrated by hot extrusion. A composite ring can also be manufactured in which the internally toothed portion 12 comprised of the second aluminum alloy powder is integrated inside the gear main body ring 11A. A composite ring can further be manufactured in which the gear main body 11 composed of the first aluminum alloy powder is integrated outside the internal teeth-forming ring 12A.

In the method for manufacturing the rigid internal gear of the wave gear device of the present example, the rigid internal gear 2 is comprised of the gear main body portion 11 that is comprised of a lightweight aluminum alloy and the internally toothed portion 12 that is comprised of a strong, abrasion-resistant aluminum alloy, and the portions 11 and 12 are integrated by powder forging or hot extrusion. The durability and the torque transmission characteristics of the rigid internal gear are therefore not compromised, and a more lightweight rigid internal gear can be ensured. Also, a lightweight wave gear device with high durability and good torque transmission characteristics can be achieved by using the rigid internal gear 2 that is manufactured with the above-described method.

What is claimed is:

1. A method for manufacturing a rigid internal gear of a wave gear device in which an internally toothed portion formed with internal teeth and a gear main body portion are joined integrally, the method comprising:

preforming an internal teeth-forming ring or disc for forming the internally toothed portion by using a first aluminum alloy powder;

manufacturing a forging in which the internal teeth-forming ring or disc is placed in a forging die and is integrally formed on its outer side with the gear main body portion using a second aluminum alloy powder, the first aluminum alloy powder being harder and having higher abrasion resistance than the second aluminum alloy powder; and applying post-processing including cutting teeth to the forging.

* * * * *